United States Patent
Parlow et al.

(10) Patent No.: US 9,371,043 B1
(45) Date of Patent: Jun. 21, 2016

(54) VEHICLE TRIM PANEL HAVING STORAGE COMPARTMENT WITH BIASED ACCESS OPENINGS

(71) Applicant: FORD GLOBAL TECHNOLOGIES, LLC, Dearborn, MI (US)

(72) Inventors: Kathleen M. Parlow, Columbus, MI (US); Anthony Michael Zingalie, Lathrup Village, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/602,970

(22) Filed: Jan. 22, 2015

(51) Int. Cl.
*B60R 7/04* (2006.01)
*B60R 11/00* (2006.01)

(52) U.S. Cl.
CPC ...................... *B60R 11/00* (2013.01)

(58) Field of Classification Search
CPC .......... B60R 7/04; B60R 7/0473; B60R 7/05; B60R 7/06
USPC .......... 296/37.1, 37.4–37.16, 1.08, 24.34, 76; 52/716.1–717.06
See application file for complete search history.

(56) References Cited

U.S. PATENT DOCUMENTS

| | | | | |
|---|---|---|---|---|
| 1,754,086 A * | 4/1930 | Feilcke | ................ | B62D 25/105 180/69.2 |
| 5,524,951 A * | 6/1996 | Johnson | .................... | B60R 9/00 224/402 |
| 6,123,377 A * | 9/2000 | Lecher | ................ | B60H 1/00985 180/315 |
| 6,641,013 B2 * | 11/2003 | Dise | .......................... | B60R 9/00 220/23.2 |
| 7,188,882 B2 | 3/2007 | Dry | | |
| 7,364,225 B2 * | 4/2008 | Tomioka | ................ | B62D 25/02 296/196.05 |
| 7,434,859 B2 * | 10/2008 | Mulvihill | .................. | B60R 7/04 224/400 |
| 8,857,886 B2 * | 10/2014 | Kimmet | ..................... | B60J 5/04 296/100.1 |
| 2004/0217616 A1 * | 11/2004 | Haspel | ...................... | B60R 5/04 296/37.13 |
| 2005/0206185 A1 * | 9/2005 | Kimmet | .................... | B60P 3/40 296/76 |
| 2007/0102945 A1 * | 5/2007 | Mulvihill | .................. | B60R 7/04 296/24.34 |
| 2007/0200471 A1 * | 8/2007 | Boone | ................... | D06F 95/002 312/211 |
| 2007/0241582 A1 | 10/2007 | McKeever | | |
| 2008/0073927 A1 | 3/2008 | Schoemann et al. | | |
| 2009/0058120 A1 * | 3/2009 | Ioka | ..................... | B60H 1/0055 296/24.34 |
| 2009/0066106 A1 * | 3/2009 | Liu | .......................... | B60P 3/14 296/37.13 |

FOREIGN PATENT DOCUMENTS

| | | | | |
|---|---|---|---|---|
| DE | 19727007 B4 | 4/2010 | | |
| EP | 1974966 A3 | 5/2009 | | |
| FR | 2914597 A1 * | 10/2008 | ............. | B60N 2/242 |
| JP | EP 2030836 A1 * | 3/2009 | ........... | B60H 1/0055 |
| KR | 100219469 B1 | 9/1999 | | |

OTHER PUBLICATIONS

English machine translation of the description for DE19727007.
English machine translation of the description for EP1974966.
English machine translation of the description for KR100219469.

* cited by examiner

*Primary Examiner* — Dennis H Pedder
(74) *Attorney, Agent, or Firm* — Vichit Chea; King & Schickli, PLLC

(57) ABSTRACT

A vehicle trim panel is provided including a body. The body has a storage compartment, a first access opening to the storage compartment biased in a first direction and a second access opening to the storage compartment biased in a second direction.

18 Claims, 3 Drawing Sheets

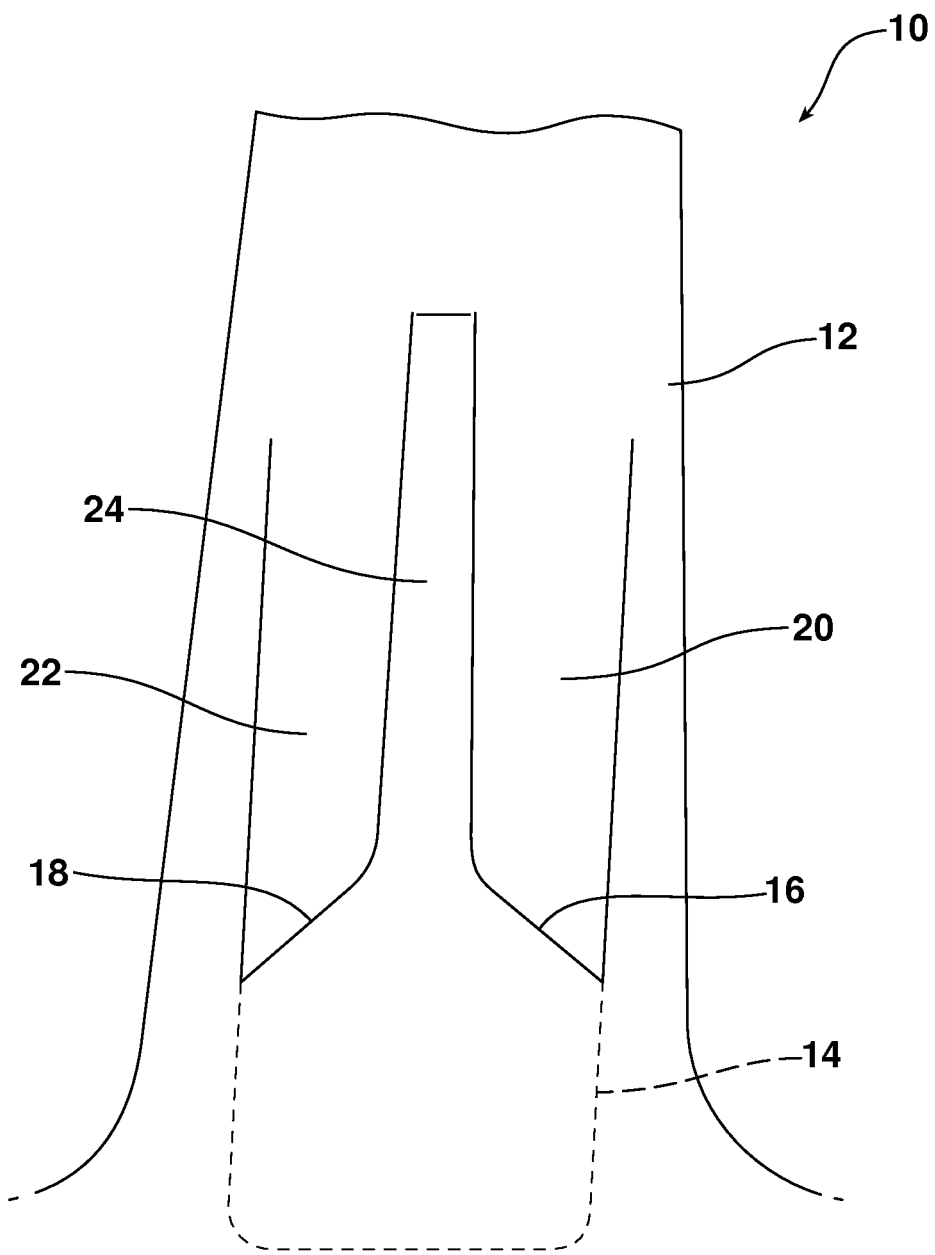

VEHICLE TRIM PANEL HAVING STORAGE COMPARTMENT WITH BIASED ACCESS OPENINGS

TECHNICAL FIELD

This document relates generally to the motor vehicle equipment field and, more particularly, to a vehicle trim panel incorporating a storage compartment with biased access openings.

BACKGROUND

Motor vehicle users are always looking for convenient places to store and hold personal items such as wallets, cell phones, electronics, flashlights, sports equipment such as golf balls, suntan lotion, eye drops and the like. In many cases the typical storage options designed into motor vehicles, including, for example, glove boxes, console bins, console cup holders, instrument panel, center stack storage compartments, door map pockets, seatback pockets and the like either do not provide enough dedicated storage or are simply not versatile enough to provide the best possible option. Further, these dedicated storage options are typically fixed and non-configurable to best meet the needs of the user. Further, most are focused upon storage within reach of the driver or front row passenger and are not conveniently available to rear seat occupants. As a result it is clear that a need exists for additional storage options in the interior trim of a motor vehicle.

SUMMARY

In accordance with the purposes and benefits described herein, a vehicle trim panel is provided. That vehicle trim panel comprises a body. The body includes a storage compartment, a first access opening to the storage compartment that is biased in a first direction and a second access opening to the storage compartment that is biased in a second direction.

In one possible embodiment, the trim panel further includes a first recess in the body that communicates with the first access opening. Further, a second recess is provided in the body communicating with the second access opening. A partition is also provided between the first recess and the second recess. Further, the first access opening is on a first side of the partition while the second access opening is on a second side of the partition.

In one possible embodiment, the recesses deepen toward the first and second access openings. In one possible embodiment, the storage compartment includes a first chamber and a second chamber. In one possible embodiment, the first access opening communicates with the first chamber and the second access opening communicates with the second chamber. In one possible embodiment, the first and second chambers are both deeper adjacent to the partition.

In one possible embodiment, the vehicle trim panel covers a pillar of a motor vehicle and the first access opening is biased toward a front of the vehicle while the second access opening is biased toward a rear of the vehicle. Further, the first access opening is oriented further toward the front of the motor vehicle than the second access opening.

In one possible embodiment, the first access opening is biased at an angle of between about 10° to about 45° with respect to the horizontal. Further, the second access opening is biased at an angle of between about 10° to about 45° with respect to the horizontal. Advantageously, the orientation and biasing of the access openings allows one on either side of the trim panel to more easily and conveniently reach the access openings and utilize the storage compartment.

In the following description, there are shown and described several preferred embodiments of the vehicle trim panel. As it should be realized, the trim panel is capable of other, different embodiments and its several details are capable of modification in various, obvious aspects all without departing from the vehicle trim panel as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the vehicle trim panel and together with the description serve to explain certain principles thereof. In the drawing figures:

FIG. 2a is a front elevational view illustrating a first embodiment of the vehicle trim panel incorporating a storage compartment having a single chamber.

Reference will now be made in detail to the present preferred embodiments of the vehicle trim panel, examples of which are illustrated in the accompanying drawing figures.

DETAILED DESCRIPTION

Figure 1:
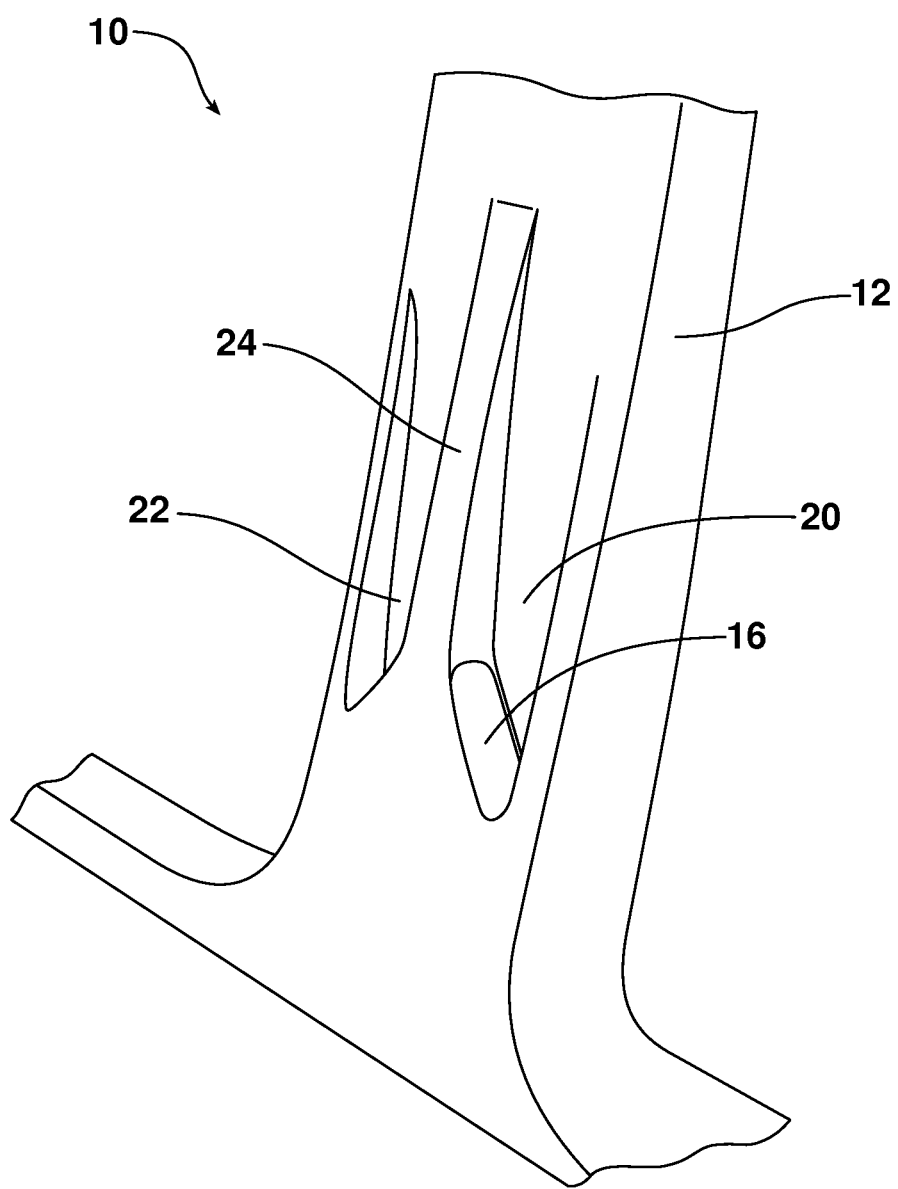
FIG. 1 is a perspective view illustrating the vehicle trim panel including the body having first and second biased access openings at the bottom of respective first and second recesses in the trim panel.

Reference is now made to FIG. 1 illustrating a vehicle trim panel 10 comprising a body 12 made from an appropriate material. Such a body 12 may, for example, be molded from a plastic or reinforced composite material if desired.

As best illustrated in FIGS. 1 and 2a, the body 12 includes an internal storage compartment 14. The body 12 also includes a first access opening 16 to the storage compartment 14 that is biased in a first direction and a second access opening 18 to the storage compartment that is biased in a second direction.

In the illustrated embodiment, the body 12 further includes a first recess 20 that communicates with the first access opening 16 and a second recess 22 that communicates with the second access opening 18. A partition 24 is provided between the first recess 20 and the second recess 22. As illustrated, the recesses 20, 22 deepen as they extend toward the first and second access openings 16, 18.

As should be appreciated, the first access opening 16 is biased or slanted at an angle of between about 10° to about 45° with respect to the horizontal H in a first direction while the second access opening 18 is biased or slanted at an angle of between about 10° to about 45° with respect to the horizontal in a second direction. The high point of each access opening 16, 18 is adjacent the partition 24 so that the storage compartment 14 is deepest adjacent the partition.

Figure 2B:
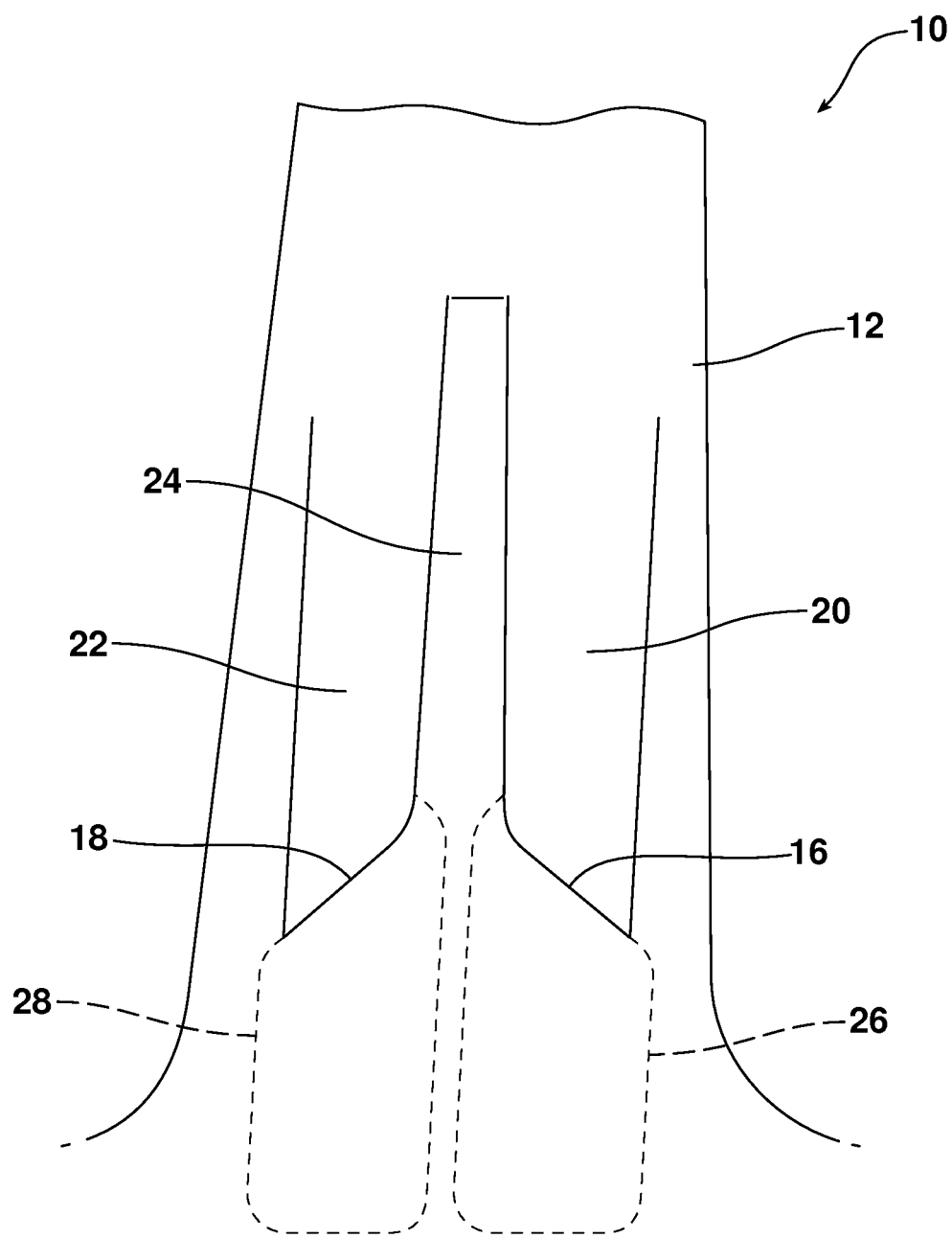
FIG. 2b is an illustration similar to FIG. 2a but showing an alternative embodiment wherein the storage compartment comprises two separate chambers accessed by means of two separate access openings.

A second embodiment of the vehicle trim panel 10 is illustrated in FIG. 2b. In this embodiment, the internal storage compartment 14 comprises a first chamber 26 and a second chamber 28. As illustrated, the first access opening 16 communicates with the first chamber 26 while the second access opening 18 communicates with the second chamber 28. As a result of the orientation of the biased access openings 16, 18, the first and second chambers 26, 28 are both deeper adjacent the partition 24.

In one particularly useful embodiment, the vehicle trim panel 10 covers a pillar of a motor vehicle. In such an embodiment, the first access opening 16 is biased toward a front of the vehicle while the second access opening 18 is biased toward a rear of the vehicle. Further the first access opening 16 is oriented further toward the front of the motor vehicle than the second access opening 18. In such an orientation, the first access opening 16 may be more easily reached and used by an individual oriented forward of the vehicle trim panel 10. In contrast, the second access opening 18 is oriented to be more easily reached and used by an individual oriented rearward of the vehicle trim panel 10. This is because in either situation, the outer side of the access opening 16, 18 is lower than the inner side making it more easy to place or insert an item through the respective access opening and into the compartment 14 or chambers 26, 28. Thus, not only is the vehicle trim panel aesthetically pleasing, it is also more user-friendly.

The foregoing has been presented for purposes of illustration and description. It is not intended to be exhaustive or to limit the embodiments to the precise form disclosed. Obvious modifications and variations are possible in light of the above teachings. For example, the vehicle trim panel 10 is not limited to pillar applications. It may also be provided at other locations including, but not necessarily limited to, the hard trim (quarter, cowl, console valence panels, hard seatbacks, the rear face of the center console and the like). In any of these locations, the biasing of the access openings 16, 18 allows the internal storage compartment 14 to be more easily reached and used by those sitting to either side of the vehicle trim panel 10. Further, while the access openings 16, 18 in the illustrated embodiment are provided at the bottom of the recesses 20, 22, they do not necessarily need to be recessed. All such modifications and variations are within the scope of the appended claims when interpreted in accordance with the breadth to which they are fairly, legally and equitably entitled.

What is claimed is:

1. A vehicle trim panel, comprising:
a body, said body including;
(a) a storage compartment;
(b) a first access opening to said storage compartment biased in a first direction;
(c) a second access opening to said storage compartment biased in a second direction; and
(d) a partition on an exterior of the body, wherein said first access opening is on a first side of said partition and said second access opening is on a second side of said partition.

2. The trim panel of claim 1, further including a first recess in said body communicating with said first access opening.

3. The trim panel of claim 2, further including a second recess in said body communicating with said second access opening.

4. The trim panel of claim 3, wherein the partition is positioned between said first recess and said second recess.

5. The trim panel of claim 4, wherein said partition rises from the body toward said first and second access openings.

6. The trim panel of claim 5, wherein said storage compartment includes a first chamber and a second chamber.

7. The trim panel of claim 6, wherein said first access opening communicates with said first chamber and said second access opening communicates with said second chamber.

8. The trim panel of claim 7, wherein said first and second chambers are angled away from the partition such that said chambers are both deeper adjacent said partition.

9. The trim panel of claim 8, wherein said vehicle trim panel covers a pillar of a motor vehicle and said first access opening is biased toward a front of said vehicle and said second access opening is biased toward a rear of said vehicle.

10. The trim panel of claim 9, wherein said first access opening is oriented further toward a front of the motor vehicle than said second access opening.

11. The trim panel of claim 10, wherein said first access opening is biased at an angle of between about 10 degrees to about 45 degrees with respect to horizontal.

12. The trim panel of claim 11, wherein said second access opening is biased at an angle of between about 10 degrees to about 45 degrees with respect to horizontal.

13. The trim panel of claim 1, wherein said storage compartment includes a first chamber and a second chamber.

14. The trim panel of claim 13, wherein said first access opening communicates with said first chamber and said second access opening communicates with said second chamber.

15. The trim panel of claim 14, wherein said vehicle trim panel covers a pillar of a motor vehicle and said first access opening is biased toward a front of said vehicle and said second access opening is biased toward a rear of said vehicle.

16. The trim panel of claim 15, wherein said first access opening is oriented further toward a front of the motor vehicle than said second access opening.

17. The trim panel of claim 16, wherein said first access opening is biased at an angle of between about 10 degrees to about 45 degrees with respect to horizontal.

18. The trim panel of claim 17, wherein said second access opening is biased at an angle of between about 10 degrees to about 45 degrees with respect to horizontal.

* * * * *